Dec. 27, 1966   F. A. GONZALEZ   3,293,868
FLUID COOLING APPARATUS
Filed Feb. 16, 1965   6 Sheets-Sheet 1
FIG. 1.
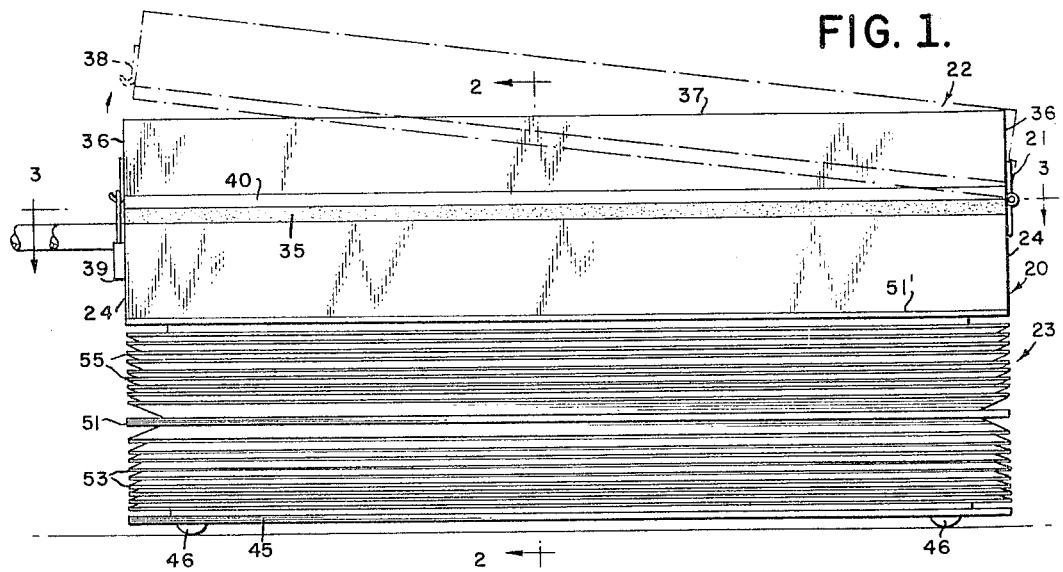
FIG. 2.
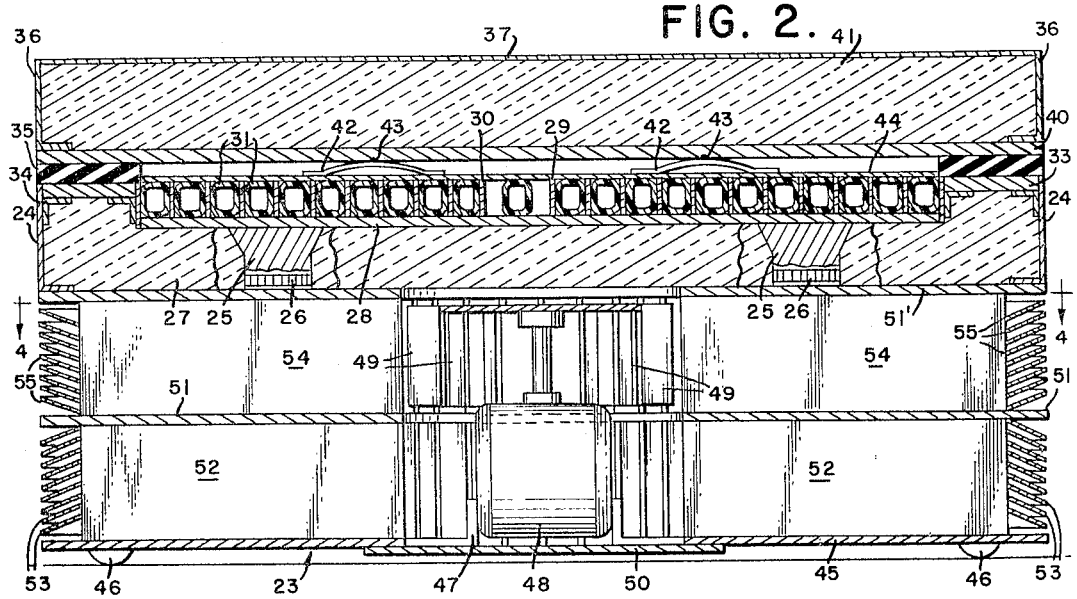
FIG. 7.
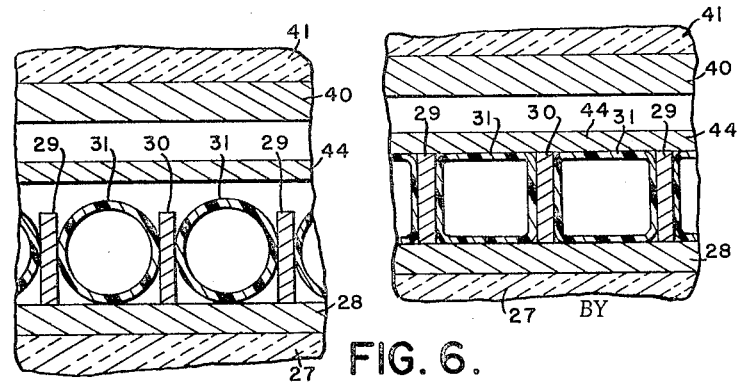
FIG. 6.
INVENTOR
FRANK A. GONZALEZ
BY Garvey & Garvey
ATTORNEYS Dec. 27, 1966     F. A. GONZALEZ     3,293,868
FLUID COOLING APPARATUS
Filed Feb. 16, 1965     6 Sheets-Sheet 2

INVENTOR
FRANK A. GONZALEZ
BY Garvey & Garvey
ATTORNEYS

Dec. 27, 1966  F. A. GONZALEZ  3,293,868
FLUID COOLING APPARATUS
Filed Feb. 16, 1965  6 Sheets-Sheet 3

INVENTOR
FRANK A. GONZALEZ

BY *Garvey & Garvey*
ATTORNEYS

Dec. 27, 1966  F. A. GONZALEZ  3,293,868
FLUID COOLING APPARATUS
Filed Feb. 16, 1965  6 Sheets-Sheet 4
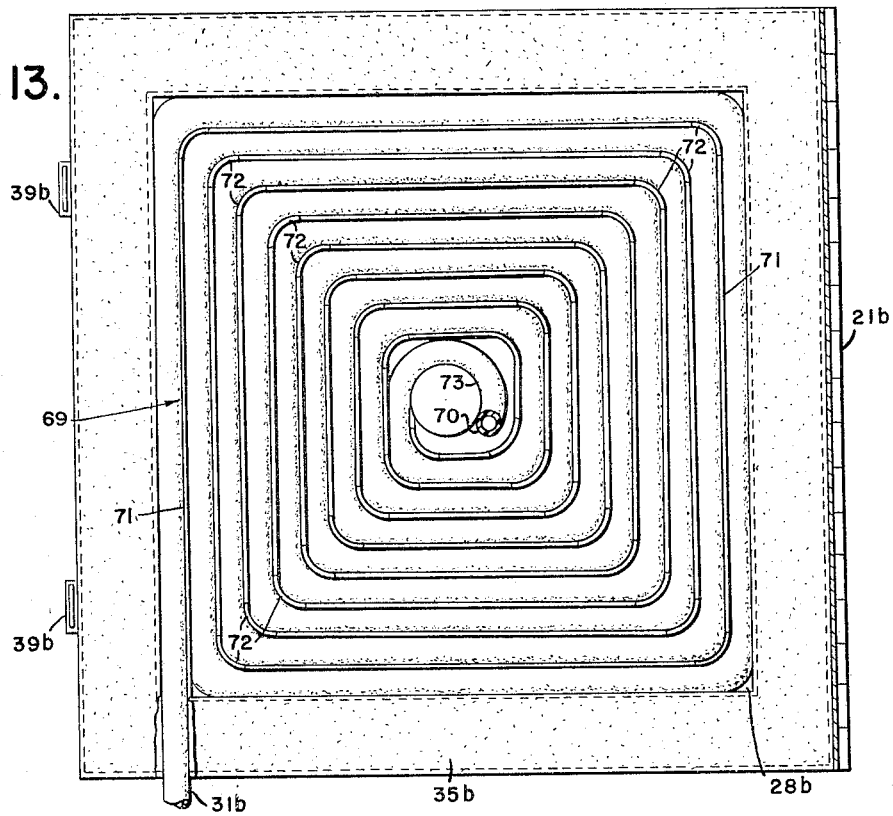
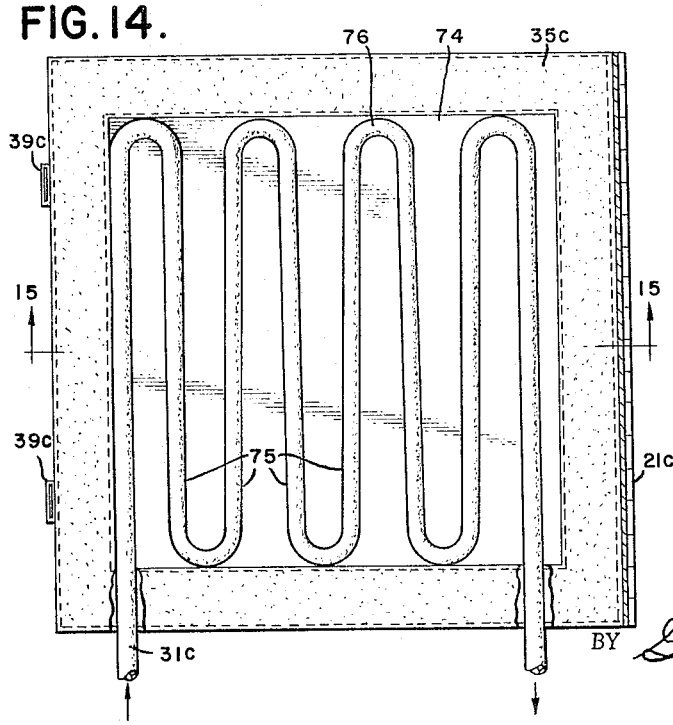
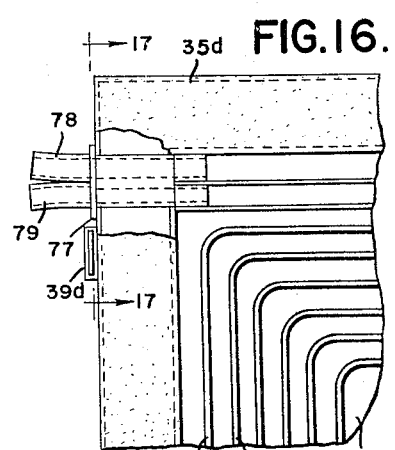
INVENTOR
FRANK A. GONZALEZ
BY Garvey & Garvey
ATTORNEYS Dec. 27, 1966 F. A. GONZALEZ 3,293,868
FLUID COOLING APPARATUS
Filed Feb. 16, 1965 6 Sheets-Sheet 5
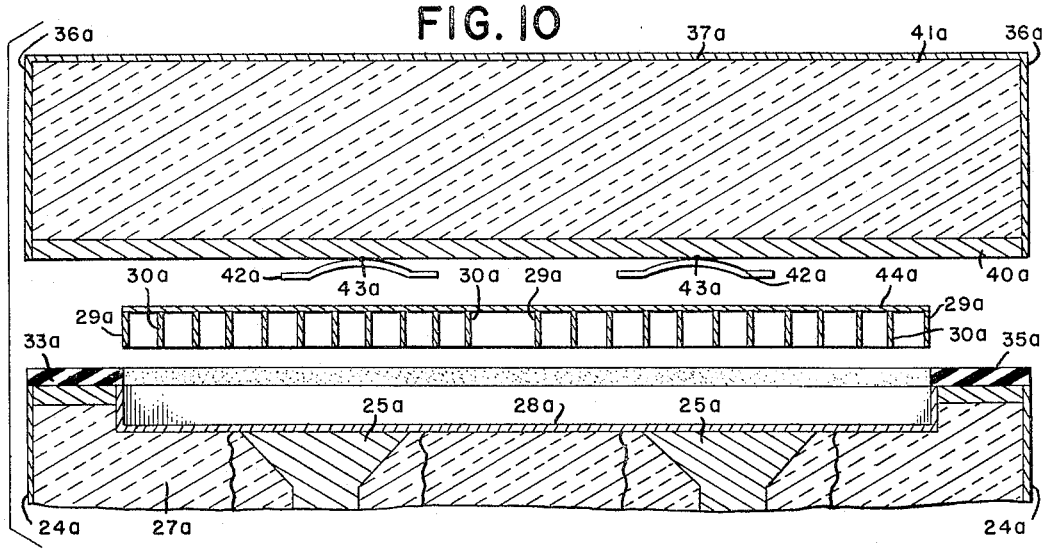
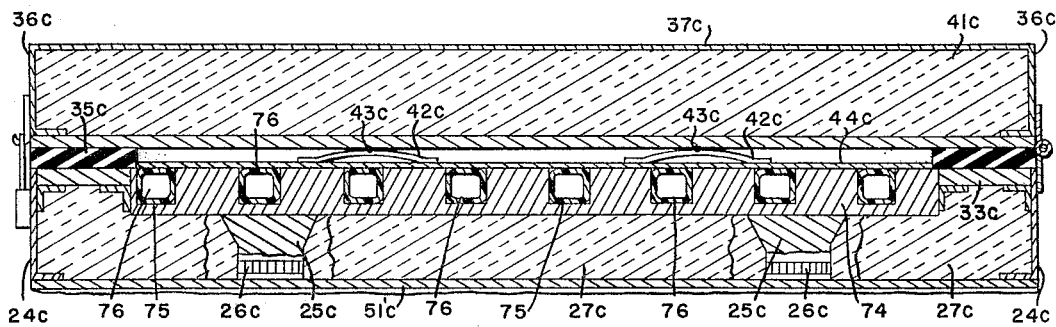
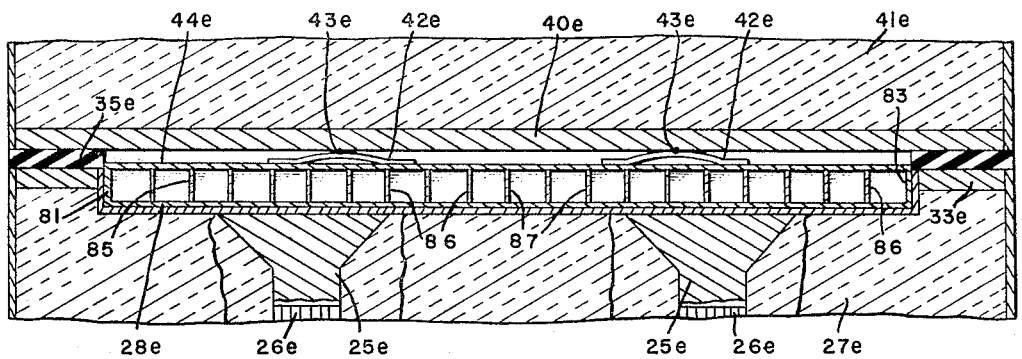
INVENTOR
FRANK A. GONZALEZ
BY Garvey & Garvey
ATTORNEYS

INVENTOR
FRANK A. GONZALEZ

BY *Garvey & Garvey*
ATTORNEYS

United States Patent Office 3,293,868
Patented Dec. 27, 1966

3,293,868
FLUID COOLING APPARATUS
Frank A. Gonzalez, New York, N.Y., assignor, by direct and mesne assignments, to Medical Electroscience, Inc.
Filed Feb. 16, 1965, Ser. No. 432,944
17 Claims. (Cl. 62—3)

This invention relates to fluid cooling apparatus, an object of which is the cooling of various liquids and gases, the apparatus being of lightweight, portable construction requiring a minimum of components.

Another object is to provide fluid cooling apparatus including a heat collector plate having at least one thermocouple in communication with one face thereof, operative to remove heat energy from the plate, upstanding heat conducting fins fixed to the opposite face of the plate in spaced relation, providing a circuitous path for the fluid to follow, from the outer periphery of the plate to the central part thereof, the fluid being cooled during the movement thereof, by the fins and collector plate, the apparatus further including an assembly proximate the collector plate for dissipating heat from the latter.

A further object is to provide fluid cooling apparatus of the character described, particularly adapted for use as a hypothermia unit, to lower the body temperature of a patient, cooling being effected by circulation of blood through sterile, flexible tubing coiled within the device, the apparatus further including a pressure plate engageable with the flexible tubing to distort the latter so that substantially the entire periphery of the tubing is in contiguous engagement with the pressure plate, collector plate and fins, to more efficiently remove heat from the blood.

Other objects are to provide fluid cooling apparatus of the character described adapted for use in conjunction with control means for regulating the operation thereof, the control means including electrical means for effecting heating of the fluid, if desired; to provide fluid cooling apparatus wherein the fluid is in direct contact with the pressure plate, collector plate and fins; to provide fluid cooling apparatus wherein the coil-like portion thereof is removable to effect ready replacement and to permit use of different types of coil units with the same basic unit, and to provide fluid cooling apparatus which, in addition to its use for hypothermia purposes, is also effective for cooling chemicals, pharmaceuticals and other commercial fluids.

Other objects of the invention will be manifest from the following description of the present preferred forms of the invention, taken in connection with the accompanying drawings, wherein:

FIG. 1 is a side elevational view of fluid cooling apparatus constructed in accordance with the present invention;

FIG. 2 is a sectional view taken along the lines 2—2 of FIG. 1, looking in the direction of the arrows, portions thereof being broken away to disclose details of construction;

FIG. 6 is an enlarged fragmentary vertical sectional view of a portion of the fluid cooling apparatus, with the cover thereof in raised position;

FIG. 7 is a view similar to FIG. 6, with the cover closed, illustrating the engagement of the flexible tube with the fins and plates of the apparatus;

FIG. 10 is a view similar to and showing the form of invention illustrated in FIG. 9, the parts thereof being depicted in exploded form to illustrate the removable nature of the fin assembly for replacement;

FIG. 13 is a top plan view of another modified form of the fluid cooling apparatus, the cover being removed to disclose details;

FIG. 14 is a view similar to FIG. 13, of still another modified form of fluid cooling apparatus;

FIG. 15 is an enlarged sectional view taken on the lines 15—15 of FIG. 14, looking in the direction of the arrows;

FIG. 16 is a fragmentary top plan view of another modified form of the present invention;

FIG. 19 is a sectional view taken along the lines 19—19 of FIG. 18, looking in the direction of the arrows, with the cover in locked position.

Figure 3:
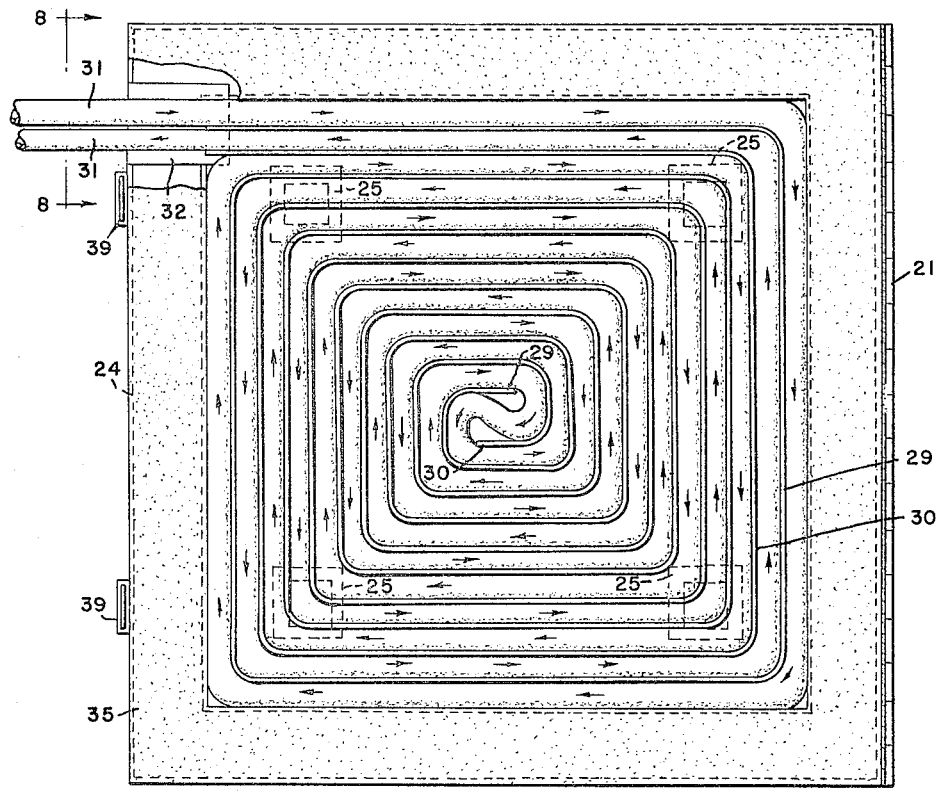
FIG. 3 is a top plan view of the fluid cooling apparatus of FIG. 1, with the cover removed to disclose details of the flexible tubular member and mounting plate forming a part of the present invention.
Figure 4:
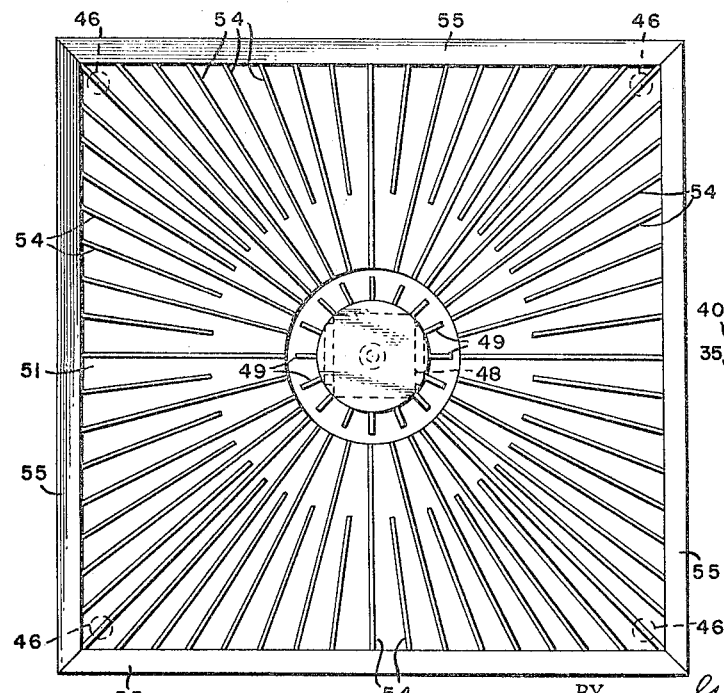
FIG. 4 is a bottom plan view of the fluid cooling apparatus showing to advantage the details of the heat dissipating assembly forming a part thereof.
Figure 8:
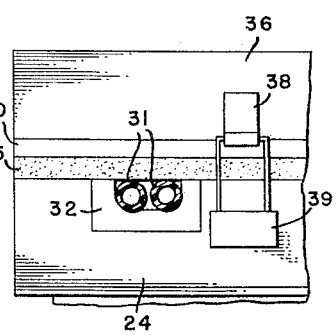
FIG. 8 is a sectional view taken along the lines 8—8 of FIG. 3, looking in the direction of the arrows, illustrating the manner of inserting tubing into the unit and showing means for locking the cover of the fluid cooling apparatus to the base thereof.

Referring now in greater detail to the drawings, there is illustrated in FIGS. 1 through 7, fluid cooling apparatus particularly adapted for use as a hypothermia unit, whereby the body temperature of the patient is lowered by directly cooling the patient's blood which is circulated through the unit and then returned to the body. This unit is preferably of portable, box-like construction, and includes a base 20, hingedly connected at 21, to a cover 22. A heat dissipating assembly 23 is fixed to the bottom face of base 20. As shown in FIG. 2, base 20 includes wall members 24, preferably of metallic construction, the lower terminals of which are preferably bent inwardly for fixed engagement with heat dissipating assembly 23.

In accordance with the present invention, one or more transfer blocks 25 are positioned in base 20 in spaced relationship to each other, the blocks being of a suitable heat conducting material such as copper. A thermocouple 26 is contiguous with the base of each transfer block 25 and is positioned superjacent heat dissipating assembly 23. A standard commercial thermocouple such as manufactured by Materials Electronics Corporation of Trenton, New Jersey, has been found to give the desired results. The upper portion of each transfer block 25 is flared outwardly and is flattened at its terminal to provide a substantial surface area. Transfer blocks of any other suitable design may also be employed. Suitable electric wiring (not shown) connects thermocouples 26 to a source of electrical energy. Standard insulation 27 fills the void in the base between wall members 24.

The upper surface of each transfer block 25 is in engagement with a flat collector plate 28 of a heat-conducting material such as copper. As shown in FIG. 2, plate 28 is fixed in base 20 in spaced relation to outer walls 24 in a manner hereinafter more fully set out.

A continuous elongated tube guide fin 29 is soldered or secured in any other suitable fashion, normal to collector plate 28. Tube guide fin 29 is of any suitable heat-conducting material such as copper and, as shown in FIG. 3, is coiled in maze-like fashion and in predetermined spaced relationship, from the outer periphery of collector plate 28 inwardly to a point centrally of the plate. A second continuous tube guide fin 30, of like construction extends from a point centrally of plate 28 outwardly in similar maze-like fashion to the outer periphery of collector plate 28. Tube guide fins 29 and 30 are so positioned on collector plate 28 to leave passageways of uniform width therebetween, from the peripheral edges of the plate to the central portion thereof, where the distance between the terminals of the fin guides is enlarged for purposes to be hereinafter more fully set out.

A continuous, flexible medical tubing 31 of sterile polyethylene plastic or the like, is inserted into base 20 at the locus of a channeled insert 32, secured to the base, which insert is made of TEFLON or other suitable material. Tubing 31 is trained between outermost guide fins 29 and 30, and then continuously coiled inwardly to the center of the base, whereupon, by virtue of the spaced relationship of the innermost extremities of guide fins 29 and 30, the direction of the flexible tubing is reversed and coiled outwardly in maze-like fashion, where it extends outwardly from the unit through channeled insert 32 at a point adjacent the entry of the tube into the unit. It will be seen from a consideration of the direction of the arrows in FIG. 3, that the blood in adjacent sections of the tubing flows in opposite directions.

Base 20 further includes a hard plastic filler 33 made of Bakelite, Formica or other material of low heat conducting characteristics, which is interposed between outermost guide fin 30 and walls 24 at a point substantially uniplanar with the upper extremities of these members. Filler 33 is supported by any suitable angle members 34. A gasket 35 is preferably superimposed on, and fixed to, filler 33, but, if desired, may be attached to cover 22.

Cover 22 includes walls 36 and a top 37 preferably of metallic construction, the front wall being provided with locking elements 38 adapted for engagement with complemental locking elements 39 secured to the front wall 24 of base 20, to effect locking of the unit in closed position. The bottom wall of cover 22 is indicated at 40 and is preferably of a hard plastic material such as Bakelite or Formica. Bottom wall 40 is preferably secured to inwardly directed flanges formed by the lower extremities of walls 36. Insulation 41 is positioned in cover 22 in the void between top 37 and bottom wall 40.

It is further within the contemplation of the present invention to provide a plurality of leaf springs 42, the upper bowed portion of which is secured in any suitable manner to bottom wall 40 as indicated at 43. The terminals of leaf springs 42 engage a flat pressure plate 44 which is superjacent and of substantially the same dimensions as collector plate 28. Plate 44 is preferably of metallic construction, such as aluminum or copper. When cover 22 is moved to the closed, locked position shown in FIG. 2, pressure plate 44 is urged by springs 43 into contiguous relationship with the upper extremities of guide fins 29 and 30.

Referring now to FIG. 6, it will be seen that the height of guide fins 29 and 30 is uniform and that the diameter of flexible tube 31 is slightly greater than the height of the guide fins, so that when cover 22 is raised, tubing 31 extends to a point above the horizontal plane of the guide fin terminals. In this position, it will be noted that only a small area of the tubing periphery is in engagement with fins 29 and 30 and collector plate 28. By virtue of the flexible nature of tubing 31, and the aforementioned difference between the diameter thereof and the height of guide fins 29 and 30, when cover 22 is lowered into operative position and locked, tubular member 31 assumes the shape shown in FIG. 7. The force of pressure plate 44 acting upon the upper surface of tube 31, forces the normally circular tube to assume a substantially rectangular shape with resultant contact of substantially all of the outer periphery of the tube with collector plate 28, guide fins 29, 30, and pressure plate 44. This enables the unit to more efficiently and quickly cool the blood coursing through tube 31.

Heat-dissipating assembly 23 connected to base 20, is designed to rapidly remove and disperse heat from transfer block 25. Assembly 23 includes a base plate 45 having feet 46 for supporting the present unit. Base plate 45 is provided with a central aperture adjacent which is a motor-mounting plate and seating guide 47 for a conventional electric motor 48 which drives a rotary blower 49. An attaching plate is indicated at 50. A fin unit is mounted on base plate 45, the unit including a metallic mounting plate 51 to which are soldered a plurality of metallic fins 52 which radiate outwardly from a central aperture through which motor 48 and rotary blower 49 pass. At their outermost extremities, fins 52 are provided with a series of downwardly directed louvers 53. A second fin unit includes fins 54 which extend between and are fixed to, mounting plate 51 and a like, upper mounting plate 51'. Mounting plate 51' is secured to flanges of wall members 24 to attach heat-dissipating assembly 23 to base 20. The terminals of fins 54 are provided with upwardly directed louvers 55. Air is directed towards motor 48 and rotary blower 49 through the downwardly directed louvers 53 and then, outwardly therefrom, past radial heat-dissipating fins 54, through upwardly directed louvers 55. While the above-described fin arrangement has been found to give optimum results, it is to be understood that various other fin designs may be employed.

Figure 5:
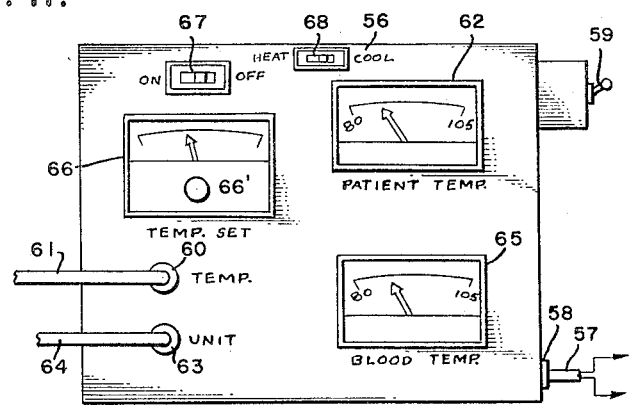
FIG. 5 is a plan view of the control panel for use in conjunction with the present assembly when employed as a hypothermia unit.

It is within the contemplation of the present invention to provide, when the apparatus is to be used as a hypothermia unit, a control panel 56 connected to a power source through electrical line 57 (see FIG. 5). If connected to an alternating current source, a conventional rectifier 58 is inserted in line 57. 59 designates a fuse or circuit breaker. Control panel 56 further includes a plug 60 adapted to receive the jack of a temperature input line 61 for registering the temperature of the patient on a gauge 62 in a conventional manner. A second plug outlet 63 is connected to the thermocouples 26 by electrical means 64 for energizing the former. A gauge 65 is provided for registering the temperature of the blood flowing out of the hypothermia unit, for which purpose any suitable temperature recording means may be employed. A manually set temperature gauge 66 is located on the panel for automatically cutting off the hypothermia unit when the reading of gauge 65 corresponds to that of manual gauge 66. Any suitable circuit-breaking means may be used for this purpose. A manual operating switch for the control panel 56 is located at 67. A second manually operating switch 68 is located on control panel 56 and is in circuit with thermocouples 26 for reversing the polarity of the thermocouples with resultant selective heating or cooling of the blood flowing through the hypothermia unit.

In use of the present invention for cooling the patient's blood temperature, input line 61 is inserted in plug 60 and unit temperature means 64 is inserted in plug 63. Gauge 66 is manually set by a knob 66' and switch 68 actuated to set the polarity of thermocouples 26 for a cooling operation. Switch 67 may then be turned on for initiating the cooling operation.

The input end of flexible tubing 31 may be connected to heart-lung equipment, for example, and the output end thereof connected to conventional means for re-admitting the blood to the patient. During the circulation of the blood through the present unit, the heat of the blood is transferred to fins 29 and 30 through tubing 31 and then to collector plate 28. Collector plate 28 transmits the heat through transfer blocks 25 to the fins of heat dissipating assembly 23. The actuation of motor 48 produces a flow of cool air through lower louvers 53, past fins 52, following which the air is directed by blower 49 past fins 54 to remove the heat therefrom and dissipate the latter through upper louvers 55.

Circulation of the blood through the machine is continued until the temperature thereof is reduced as indicated on gauge 65 to the pre-set temperature indicated on gauge 66, at which time, cooling will be automatically discontinued.

The device of the present invention is further adapted for bringing the temperature of the cooled blood back to its normal temperature by virtue of the Peltier effect, characteristic of thermocouples. For carrying out this operation, switch 68 is moved to the "heat" position thereby reversing the polarity of the thermocouples to which the switch is electrically connected, and effecting a heating of collector plate 28 and fins 29 and 30 which is transmitted through tube 31 to the blood. Just as in the cooling operation, gauge 66 may be pre-set to the desired temperature and the blood recirculated through the unit until it has been raised to the indicated temperature at which point the unit is shut off.

Figure 9:
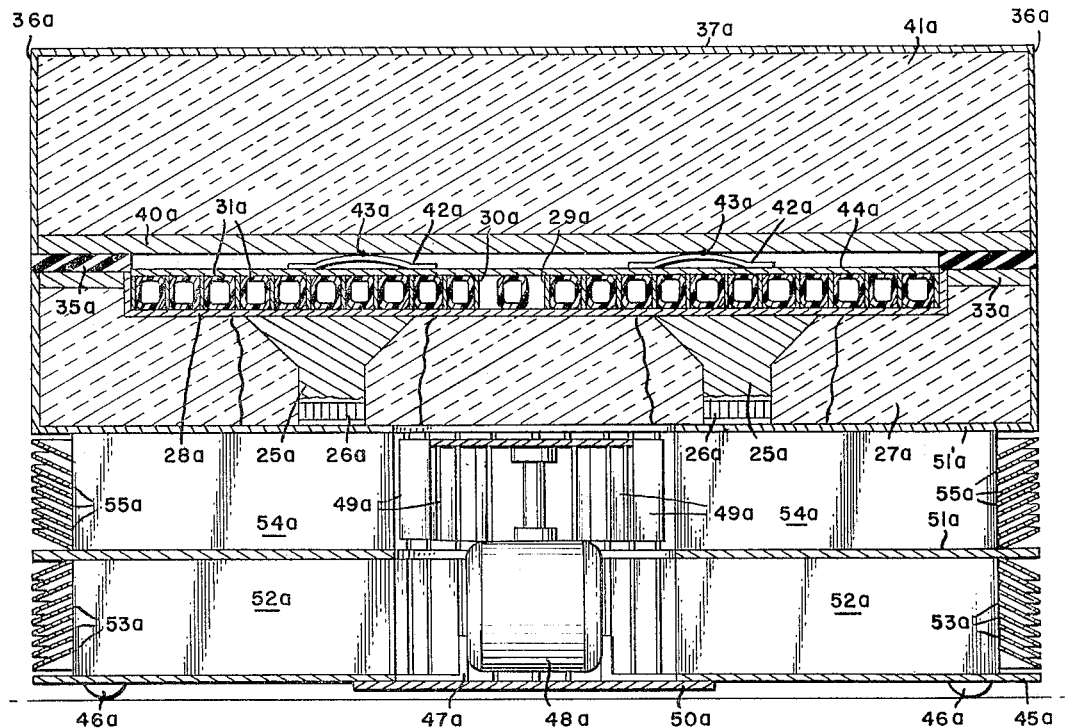
FIG. 9 is a view similar to FIG. 2, illustrating a modified form of the present invention.
Figure 11:
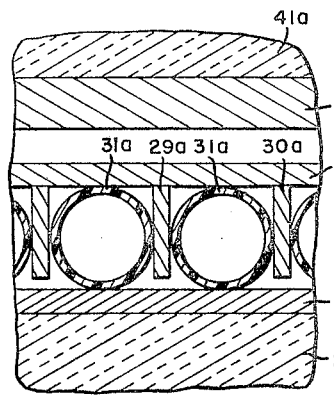
FIG. 11 is an enlarged fragmentary vertical sectional view of a portion of the fluid cooling apparatus, illustrating the fin assembly in position of use prior to the application of force, by the cover on the pressure plate.
Figure 12:
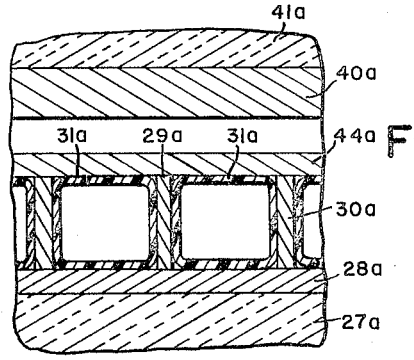
FIG. 12 is a view similar to FIG. 11 with the cover closed, illustrating the engagement of the flexible tube with the fins and plates of the fluid cooling apparatus.

In FIGS. 9 through 12 there is shown a modified form of the apparatus of the present invention, which is basically similar to the form of invention illustrated in FIGS. 1 to 8, and wherein like parts are identified by like numbers, followed by the letter $a$. In this form of the invention, however, as shown in FIGS. 9 and 10, fins 29$a$ and 30$a$ are not fixed to collector plate 28$a$, but are mounted on pressure plate 44$a$, which is not connected to springs 42$a$. The pressure plate and connected fins are therefore an independent part of the unit, permitting ready removal and replacement thereof by like members, or by members employing more or less fins embodying a variety of patterns for coiling the tube carrying blood or other fluid, to effect different cooling results. In this manner, the same basic unit may be employed for numerous fin plate attachments, readily insertable in the unit base for obtaining a predetermined result. In FIGS. 11 and 12, there is illustrated the manner in which the form of invention of FIGS. 9 and 10 effects distortion of tubing 31$a$ to effect optimum contiguous relationship of the tubing wall with fins 29$a$ and 30$a$, pressure plate 44$a$ and collector plate 28$a$ in a manner similar to that illustrated in FIGS. 6 and 7. In this modified form of the invention, however, when connected pressure plate 44$a$ and fins 29$a$ and 30$a$ are inserted in base 20$a$, tubing 31$a$ engages collector plate 28$a$ and the free terminals of fins 29$a$ and 30$a$ are in spaced relationship thereto. When cover 22$a$ is closed and locking elements of the unit are interengaged, springs 42$a$ exert downward pressure on pressure plate 44$a$ and connected parts, thereby distorting flexible tubing 31$a$ to the position shown in FIG. 12 at which time the lower terminals of fins 29$a$ and 30$a$ are engaged with collector plate 28$a$.

In FIGS. 13, there is illustrated another modified form of the present invention employing the same basic arrangement as the forms of invention illustrated in FIGS. 1 to 8 and 9 to 12, wherein similar parts are identified by like numbers, followed by the letter $b$.

In this form of invention, however, a single continuous guide assembly 69 is employed, which begins at the peripheral edges of collector plate 28$b$ and spirals inwardly at a uniform distance apart to a point adjacent the center, indicated at 70, where it is bent upwardly through the cover of the hypothermia unit. Alternatively, the assembly may be bent downwardly through the base of the unit. Assembly 69 includes a plurality of vertical parallel rectilinear fins 71, progressively decreasing in length from the outer to the central part of the assembly. Adjacent terminals of fins 71 are joined by copper strips 72, or strips of like conducting material, which strips are preferably soldered to the fins. Strips 72 are curvilinear, the radius of curvature being matched to the bending characteristics of tube 31$b$ to obviate crimping of the latter. At the center of the unit there is provided a circular copper strip 73 which is secured to collector plate 28$b$ and forms a guide for the innermost portion of flexible tube 31$b$. The radius of curvature of circular copper strip 73 also corresponds to the bending characteristics of the tube. Operation of this form of invention is the same as described above in connection with the form of invention illustrated in FIGS. 1 to 8, with the exception that the blood flows in one direction, i.e. inwardly to the center portions of the unit during which time it is gradually cooled before emission at 70.

In FIGS. 14 and 15 there is illustrated another modified form of the present invention which is basically the same as that employed in the forms of invention illustrated in FIGS. 1 through 13 and wherein like parts are identified by the same numbers, followed by the letter $c$. In this form of the invention, however, the fins and collector plate are replaced by a solid heat conducting member designated 74 which is of rectangular conformation and is adapted to rest in base 20$c$ in direct contact with thermocouples 26$c$. In accordance with this form of the invention, heat conducting member 74 is of substantial thickness and is provided with a sinuous slot 75, extending through the length and breadth of member 74 and in communication with the upper face thereof. A fluid carrying tube 76 is adapted for placement in slot 75. As shown to advantage in FIG. 15, tube 76 is distorted by pressure plate 44$c$ in the manner above described in the forms of invention illustrated in FIGS. 1 through 8. The operation of this form of apparatus is the same as that described above in connection with the forms of invention illustrated in FIGS. 1 through 13. Member 74 may be either a permanent attachment, or a removable part of the apparatus as desired.

Figure 17:
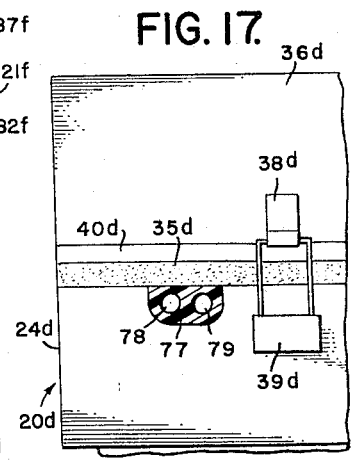
FIG. 17 is a sectional view taken along the lines 17—17 of FIG. 16, looking in the direction of the arrows.

In FIGS. 16 and 17 there is illustrated a further modification of the present invention which is basically similar to the form of invention illustrated in FIGS. 1 through 8. Like parts are accordingly identified by the same numbers, followed by the letter $d$. This form of invention is particularly adapted for the cooling of air or other gases and may be used for hypothermia to cool air which is transmitted to a cooling blanket or other device applied to the body of a patient. In this form of the invention, no tube is employed between fins 29$d$ and 30$d$, the air or gas being in direct contact therewith and circulating in a manner similar to any of the forms of invention illustrated in FIGS. 1 to 15. For admitting the air or gas to the assembly and removing the same therefrom, a block insert 77 is adapted for placement in a complemental recess in front wall member 24$d$ of base 20$d$. Block 77 may be of any suitable material such as Teflon and is provided with a pair or parallel, spaced, cylindrical bores adapted to receive an inlet tubular member 78 and an outlet tubular member 79. As shown in FIG. 16, tubular members 78 and 79 extend inwardly beyond the limits of block insert 77 and are in contiguous relationship with fins 29$d$ and 30$d$ for readily effecting admission of air or gas to the assembly and removal therefrom.

Although in this form of the invention the collector plate, fins, and pressure plate may be a permanent part of the assembly, it is preferable that these three components be fixed together to form an independent unit which may be inserted into and removed from the assembly as desired. By this construction, any likelihood of air or gas escaping or not following the defined circuitous passage from the outer periphery to the center of the collector plate, is precluded.

Figure 18:
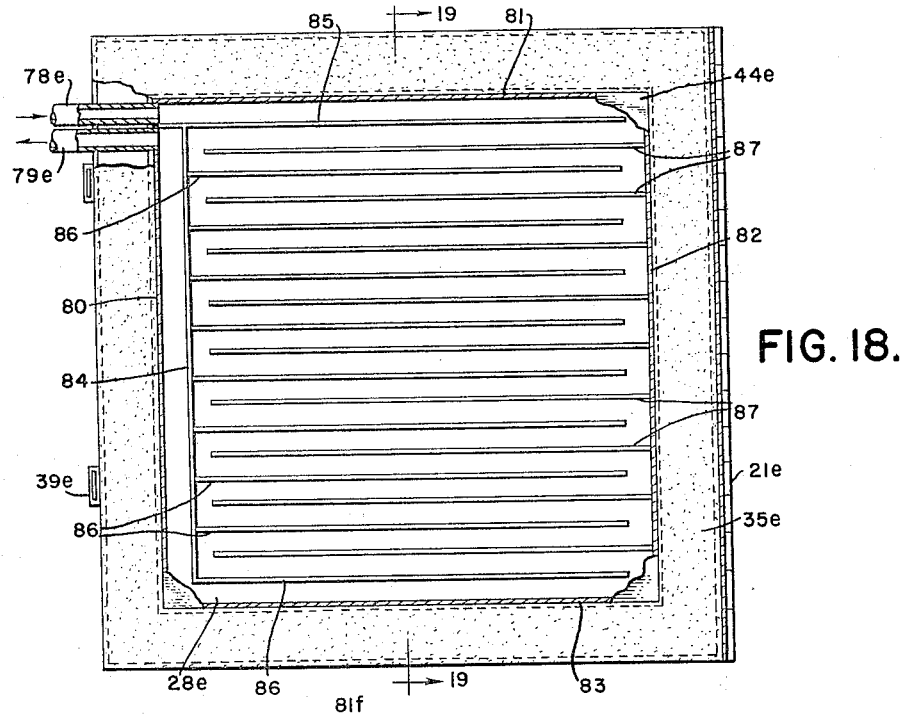
FIG. 18 is a top plan view of a further modification of the present fluid cooling apparatus with the cover thereof removed and portions thereof broken away to disclose details of construction.

In FIGS. 18 and 19, still another form of invention employing the same basic assembly is illustrated, wherein other means are provided for effecting cooling. In this form of the invention, those parts which are similar to parts of other forms of the invention are identified by the same numbers, followed by the letter $e$.

In order to provide a sealed assembly, the pressure plate, collector plate and fins are fixed together to form an independent unit. This unit includes peripheral fins 80, 81, 82 and 83 interposed between collector plate 28e and pressure plate 44e, fin 80 being provided with openings for the reception of inlet tube 78e an an outlet tube 79e. An internal fin 84 lies in spaced parallel relation to fins 81 and 83. An internal fin 85 extends in spaced parallel relation to fin 81, said internal fin being fixed to fin 80 at a point between the inlet tube 78e and outlet tube 79e and spaced from fin 82. The adjacent terminal of fin 84 engages fin 85. A plurality of equally spaced, parallel fins 86 extend from fin 84 to a point spaced from fin 82. Between adjacent fins 86 there is positioned, in parallel, equally spaced relation, a fin 87 extending from fin 82 to a point spaced from fin 84.

It will be seen from a consideration of FIG. 18 that fluid passes through inlet tube 78e into the passage formed between fins 81 and 85 and follows the circuitous route back and forth between fins 86 and 87, fins 86 and 83 and then between fins 80 and 84 before emission through the outlet tube 79e.

Figure 20:
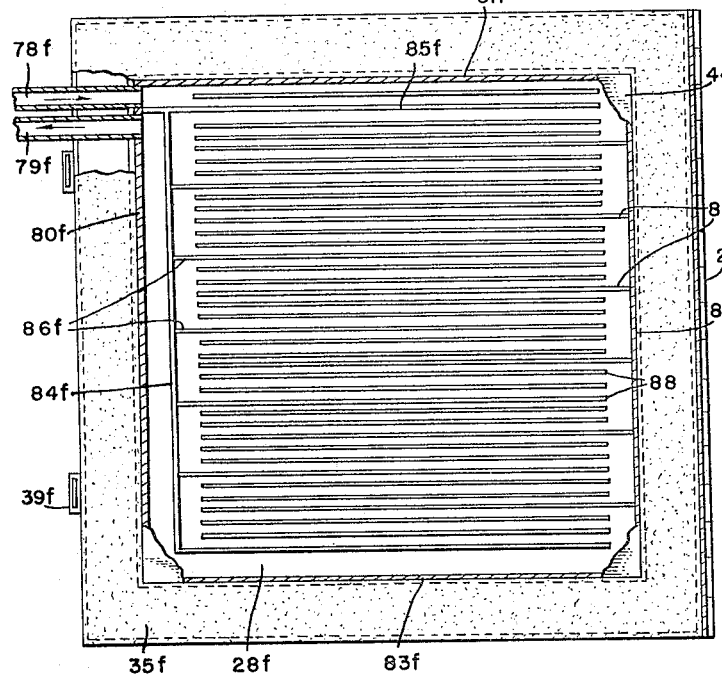
FIG. 20 is still another modification of the present invention.

In FIG. 20 there is illustrated a further modification of the present invention which is similar to the form of invention shown in FIGS. 18 and 19. Parts of the invention shown in FIG. 20 which are the same as that shown in FIGS. 18 and 19 are identified by like numbers, followed by the letter f. The form of invention illustrated in FIG. 20 is adapted to effect an increased cooling capacity by providing a series of uniformly spaced parallel fins 88 interposed between fins 81f and 85f, fins 85f and 87f, fins 87f and 86f and between fins 87f and 83f. The terminals of fins 88 are also spaced from lateral fins 82f and 86f. With this form of the invention, therefore, the fluid, in following the circuitous route over collector plate 28f contacts a multiplicity of heat-removing fins for rapidly attaining the desired cooling effect.

It is of course to be understood that in the various modifications of the present invention employing independent fin units through which the fluid is passed for cooling, these units may, if desired, be permanently attached to the transfer blocks.

The fluid cooling apparatus of the present invention requires a minimum of components which may be readily assembled to provide a device possessing the desired cooling capacity. Additionally, the cooling apparatus eliminates the need for a heavy and expensive compressor, thereby providing lightweight portable fluid cooling apparatus which may be economically constructed and manufactured.

While there has been herein shown and described preferred forms of the present invention, it is to be understood that such has been done for purposes of illustration only, and that various changes may be made therein within the scope of the claims hereto appended.

I claim:
1. Fluid cooling apparatus comprising a base, a collector plate mounted in said base, guide fin means on said collector plate in predetermined spaced relation and arranged to form a circuitous fluid passageway over the collector plate, inlet and outlet means in communication with the fluid passageway, plate means superjacent said collector plate engageable with the upper terminals of said guide fins to enclose the passageway between the inlet and outlet means, at least one thermocouple below and in heat-conducting engagement with said collector plate, and a heat-dissipating assembly engageable with the lower extremity of said base, said assembly including fan means for dispersing the heat gathered by said collector plate upon actuation of said thermocouple.

2. The apparatus of claim 1, wherein said guide fin means are fixed to said collector plate.

3. The apparatus of claim 1, wherein said guide fin means are fixed to said plate, the guide fin means and plate being removable as a unit from the remainder of the apparatus.

4. The apparatus of claim 1, wherein said collector plate, plate and guide fin means are secured together to form a sealed independent unit removably positioned in said base.

5. The apparatus of claim 1 with the addition of a flexible tube in the passageway between said collector plate, plate and guide fin means, and engageable therewith, said collector plate, plate and guide fin means being of heat-conducting material.

6. The apparatus of claim 5 wherein the external diameter of said flexible tubular member is greater than the height of said guide fin means, and means for urging said plate downwardly into engagement with the upper terminals of said guide fin means thereby distorting said flexible tube so that substantially the entire outer periphery of the tube is in engagement with said collector plate, plate and guide fin means.

7. The apparatus of claim 5 wherein said flexible tube extends from a point external of said base in communication with said inlet means and is coiled between said guide fin means inwardly to the center of the collector plate, at which point the direction of the tube is reversed and coiled outwardly between said guide fin means to a point externally of the collector plate in communication with said outlet means.

8. The apparatus of claim 5 wherein said flexible tube extends from a point external of said base in communication with said inlet means and coiled inwardly between said guide fins to the center of the collector plate, at which point it is in communication with said outlet means for directing the fluid to a point external of the apparatus.

9. Fluid cooling apparatus comprising a base, a collector plate mounted in said base, a first guide fin on said collector plate in predetermined spaced relation extending from the peripheral edges of said collector plate inwardly toward the central portion thereof, a second guide fin extending from the central portion of said collector plate outwardly to the periphery of said collector plate in predetermined uniform spaced relation to said first guide fin, a flexible tube extending from a point external of said base and coiled between said guide fins toward the center of the collector plate, at which point the direction of the tube is reversed and coiled outwardly between said guide fins to a point externally of the base, a heat conducting transfer block in said base below and in engagement with, said collector plate, a thermocouple engaged with said transfer block, and a heat-dissipating assembly mounted on said base subjacent said transfer block and thermocouple, the assembly including a blower and spaced fins extending outwardly from said blower.

10. The apparatus of claim 9 with the addition of a cover hingedly connected to said base, a spring-pressed pressure plate carried by said cover and engageable with said tube and fins when the cover is lowered, and complemental locking elements carried by said base and cover for retaining the same in interlocked relationship when engaged.

11. The apparatus of claim 9 wherein the external diameter of said flexible tube is greater than the height of said guide fins, to effect distortion of the flexible tube so that substantially the entire outer periphery of the tube is in engagement with said collector plate, pressure plate and fins.

12. The apparatus of claim 9, with the addition of a cover hingedly engaged with said base, spring means connected to said cover, a pressure plate removably positioned in said base, one face of said pressure plate being engaged by said spring means, said guide fins being affixed to the opposite face of said pressure plate, to permit removal and replacement of said pressure plate and guide fins as a unit.

13. The apparatus of claim 9, with the addition of control means operatively connected to said thermocouple, means for recording the temperature of said fluid, and means for reversing the electrical polarity of said thermocouple, to effect a heating of fluid flowing through the apparatus.

14. A fluid cooling apparatus comprising a base, a collector plate mounted in said base, guide fin means on said collector plate forming a circuitous fluid passageway over said collector plate, said passageway having an inlet and an outlet, tube means positioned on said collector plate and between said guide fins and in thermal contact therewith and extending from said inlet to said outlet means, at least one thermocouple below and in heat-conducting engagement with said collector plate, and a heat dissipating assembly engageable with the lower extremity of said base, said assembly including fan means for disbursing the heat produced by actuation of said thermocouple.

15. The apparatus of claim 14 wherein said guide fin means include heat conducting elements raised above said collector plate forming between pairs of said raised members a channel into which is intimately received said tube means.

16. A fluid cooling apparatus comprising a base, a collector plate mounted in said base, guide means in cooperation with said collector plate forming a circuitous fluid passageway over said collector plate, said passageway having an inlet and an outlet, tube means positioned on said collector plate and between said guide means and in thermal contact therewith, at least one thermocouple below and in heat-conducting engagement with said collector plate, and a heat dissipating assembly engageable with the lower extremity of said base, said assembly including fan means for disbursing the heat produced by actuation of said thermocouple.

17. The apparatus in accordance with claim 16 wherein said collector plate and said guide means are formed of heat conducting material and are welded together.

References Cited by the Examiner
UNITED STATES PATENTS

| | | | |
|---|---|---|---|
| 3,137,141 | 6/1964 | Kistler | 62—3 |
| 3,212,274 | 10/1965 | Eidus | 62—3 |

WILLIAM J. WYE, *Primary Examiner.*